United States Patent [19]

Tellerman

[11] Patent Number: 4,952,873
[45] Date of Patent: Aug. 28, 1990

[54] COMPACT HEAD, SIGNAL ENHANCING MAGNETOSTRICTIVE TRANSDUCER

[75] Inventor: Jacob Tellerman, Bayside, N.Y.

[73] Assignee: MTS Systems Corporation, Eden Prairie, Minn.

[21] Appl. No.: 405,453

[22] Filed: Sep. 11, 1989

[51] Int. Cl.⁵ .................. G01B 7/26; G01F 23/30
[52] U.S. Cl. ...................... 324/207.13; 324/209; 73/314; 333/148
[58] Field of Search ............ 324/207.13, 207.15, 324/207.24, 207.26, 209, 262, 239; 73/313, 314; 333/148

[56] References Cited

U.S. PATENT DOCUMENTS

| | | | |
|---|---|---|---|
| 3,898,555 | 8/1975 | Tellerman | 324/207.13 |
| 4,028,619 | 6/1977 | Edwards | 324/207.13 |
| 4,071,818 | 1/1978 | Krisst | 324/207.13 |
| 4,305,283 | 12/1981 | Redding | 324/207.24 X |
| 4,510,587 | 4/1985 | Schneider | 324/207.15 X |
| 4,654,590 | 3/1987 | Kitaura et al. | 324/207.13 |
| 4,678,993 | 7/1987 | Vinnemann et al. | 324/207.13 |
| 4,721,902 | 1/1988 | Tellerman | 324/58.5 B |
| 4,803,427 | 2/1989 | Mason et al. | 324/207.13 |
| 4,839,590 | 6/1989 | Koski et al. | 324/209 X |

*Primary Examiner*—Reinhard J. Eisenzopf
*Assistant Examiner*—Warren S. Edmonds
*Attorney, Agent, or Firm*—Kinney & Lange

[57] ABSTRACT

A displacement transducer utilizes a torsional strain waveguide having a magnetic member that is adjustable positioned along the length of the waveguide, when an electrical current pulse is passed along the waveguide and reaches the magnet torsional strain wave is created in the waveguide. The torsional strain wave will be reflected back toward a mounting end of the waveguide where a converter or sensor is positioned to sense the strain wave signal and convert it to an electrical output signal. The strain wave signals have signal lobes of a time period. A waveguide mounting block supports the waveguide at the mounting end and provides a reflection point for the torsional strain waves. The waveguide mounting block is on an opposite side of the signal sensor from the magnet. The mounting block is precisely positioned a distance from the signal sensor that is equal to distance traveled by the torsional strain wave in the waveguide during one-half of the signal lobe time period so that the reflected wave becomes an additive signal to the incoming torsional strain wave signals to provide a greater amplitude to the signal being received.

9 Claims, 2 Drawing Sheets

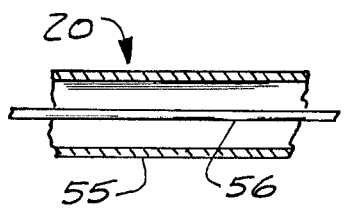
FIG. 4
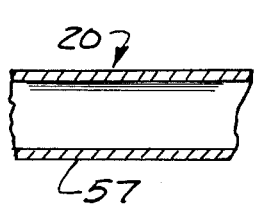
FIG. 5
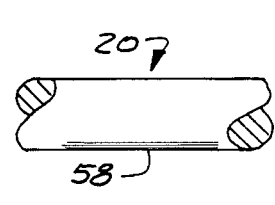
FIG. 6
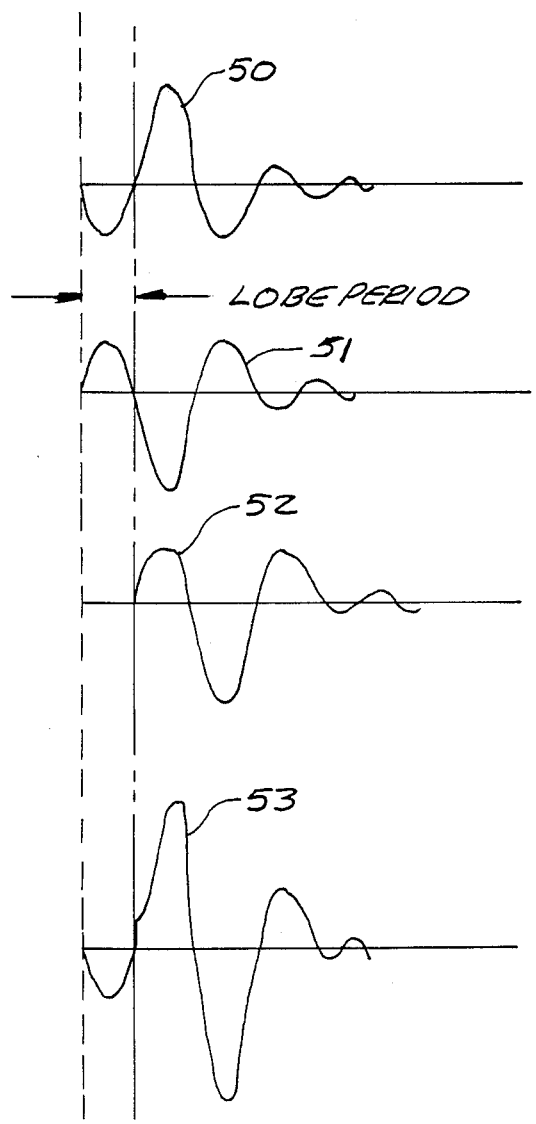
FIG. 7A
FIG. 7B
FIG. 7C
FIG. 7D

COMPACT HEAD, SIGNAL ENHANCING MAGNETOSTRICTIVE TRANSDUCER

BACKGROUND OF THE INVENTION

1. Field of the Invention.

The present invention relates to linear distance measuring devices that have compact mounting heads and which provide enhanced output signals.

2. Description of the Prior Art

U.S. Pat. No. 3,898,555 issued to the present inventor shows a linear distance measuring device of the type described herein, which uses a sonic waveguide, and The waveguide is tubular with a wire running through the center. A current pulse is sent through the wire, and a magnet that is positioned adjacent to the waveguide causes a torsional strain wave when the current pulse interacts with the magnetic field from the magnet. The torsional pulse in the waveguide is transmitted as a torsional strain wave that has a time period and which is reflected back to the waveguide mounting structure. The twisting or torsional movement is sensed by a mode converter, which provides an output signal, the output signal of the return strain wave is correlated compared to the time of launch of the current pulse causing the torsional strain wave for determining the distance to the magnet from the converter The time interval between the application of the electrical pulse and the reception of the torsional pulse by the converter indicates the position of the magnet.

U.S. Pat. No. 4,721,902 shows a noise rejection circuitry for use in the type of transducer shown in U.S. Pat. No. 3,898,555 to insure identifying the return pulse and correlating it properly to a current pulse. Patent No. '902 points out the problems of attempting to raise the return signal level from the mode converter in order to improve the signal-to-external interference noise ratio and indicates that the amplitude of the mode converter signal based on the torsional strain wave is difficult to raise higher than the noise amplitude.

The present invention provides a simple, long sought after solution to the problem of raising the amplitude of the signal received by the mode converter. The problems of low level signals are further compounded by the long length of waveguides that are now being used. Waveguide lengths of 25 feet are commonly used and lengths of 60–80 feet are in use.

SUMMARY OF THE INVENTION

The present invention relates to enhancing the output signals from a magnetostrictive displacement transducer and at the same time providing a very compact transducer mounting head. Magnetostrictive displacement transducers operate on the principle that when a current pulse is transmitted along the waveguide, and the field generated by the current encounters the magnetic field of a movable magnet, the waveguide will tend to twist in torsion, causing a torsional strain wave to be transmitted by the waveguide back to its mounting. This torsional strain wave is sensed by a mode converter, which transmits the torsional motion into an electrical signal providing an output pulse indicating a return of the torsional wave. The time between the launching of the current pulse and the return of the torsional wave related to that pulse provides a very accurate indication of the distance that the magnet is from the mounting The torsional wave return provides a pulse or lobe having a defined time period, which is the time between its commencement in a positive sense, and a recrossing of the zero point. The speed of travel of the torsional wave in a particular waveguide material can be determined, and by knowing the time period, the distance traveled by the torsional strain wave during the time period of the signal can be also determined.

It is well known that the fixed mounting of the waveguide causes reflected signals to be reflected back from the mounting toward the magnet. It has been discovered that by placing the mounting point so that the reflected wave adds to the return signal of a torsional strain wave, an enhanced amplitude return signal will be provided. Further, the spacing of the mounting block from the mode converter is thus made much less than in standard transducers providing the desirable result of having a much more compact mounting head.

A further feature is that the need for damping the return pulses reflected from the mounting block for the waveguide is not necessary. Previously a damper was provided between the waveguide mounting block and the converter. In the present invention the reflected wave, rather than being considered a liability or interference for obtaining good return signals, is used for enhancing such signals.

A further benefit is that the overall mounting plate length is substantially reduced. The effects of thermal expansion and contraction, which can cause a shift in the relationships between the mounting block, the mode converter, and the magnet sufficient to result in some error are also reduced.

Thus, the present invention provides a magnetostrictive displacement transducer which has a compact mounting head and provides an enhanced output signal without relying on changed electronics or sensing devices.

BRIEF DESCRIPTION OF THE DRAWINGS

FIG. 4 is an enlarged fragmentary sectional view of a first form of waveguide made according to the present invention;

FIG. 5 is a second form of waveguide that can be used with the present invention;

FIG. 6 is a third form of waveguide construction which can be used with the present invention;

FIG. 7A is a plot of a signal received from a typical prior art magnetostrictive transducer;

FIG. 7B is a plot of a signal that is obtained from a reflection point or reflector comprising a fixed mounting of the base end of the waveguide;

FIG. 7C is a plot of the positioning of a wave such as that shown in FIG. 7B by a distance equivalent to a time period of one positive pulse of the reflected signal; and FIG. 7D is a representation of the combined signals of FIG. 7A and FIG. 7C that provide the output signal of the present invention when the waveguide is mounted as taught herein.

DETAILED DESCRIPTION OF THE PREFERRED EMBODIMENTS

Figure 1:
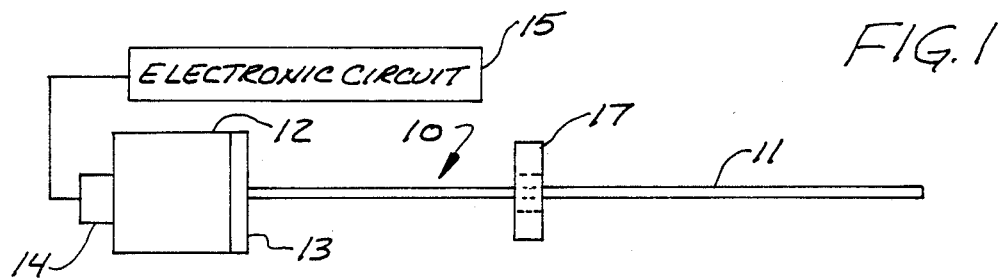
FIG. 1 is a schematic side view of a compact mounting head magnetostrictive displacement transducer made according to present invention.

A transducer having a compact head and made according to the present invention is illustrated generally at 10 and is used for measuring displacement. The transducer 10 comprises an outer protective tube or elongated cover indicated at 11 which houses an interior waveguide, as will be seen in greater detail in the subsequent figures. Tube 11 and its interior waveguide are supported in a mounting head at 12 at a base end of the transducer. The mounting head 12 includes a mounting flange 13, and a connector 14 for connecting an interior mode converter to electronic circuitry indicated generally at 15, of a type which is described in the prior art. The electronic circuitry 15 is used for providing output signals that will indicate the displacement from the reference point of the compact head 12 to a magnet head 17 which is shown schematically, placed over the protective tube 11. The magnet head 17 can be displaced along the length of the tube 11. The magnet head 17 is a permanent magnet, and as shown, is an annulus that fits around the tube 11, but it can have other configurations as desired.

The length of the protective tube 11, and the waveguide supported therein, can be substantial, for example, 25 feet is usual and, the length can go to in the range of 60–80 feet. The position of the magnet head along this waveguide and outer tube can indicate the level of the liquid in a tank, for example, so that the liquid level can be sensed accurately. The sensing is carried out through magnetostrictive principles, as is well known.

Figure 2:
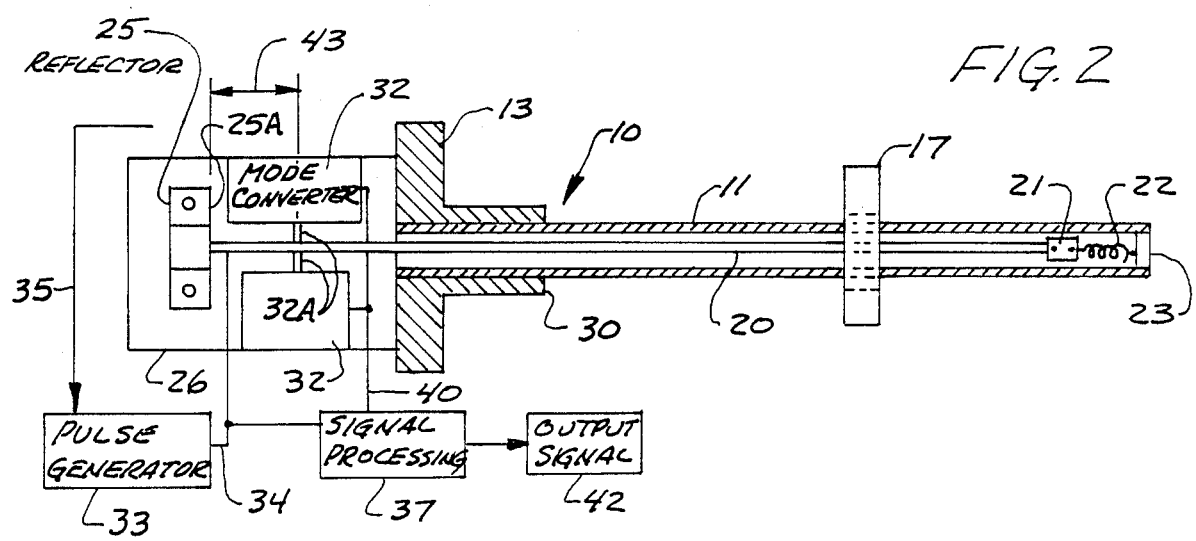
FIG. 2 is a schematic sectional view of a magnetostrictive transducer made according to the present invention.
Figure 3:
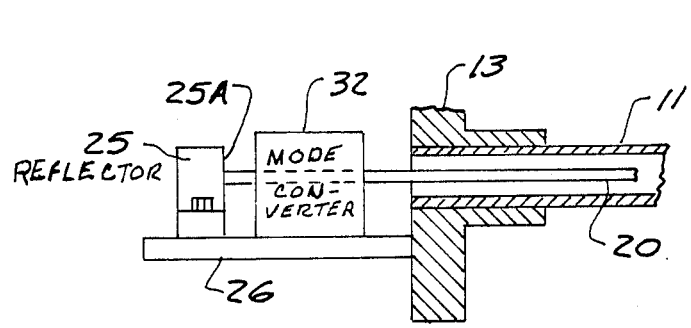
FIG. 3 is an end view of a waveguide retainer used in the device of FIG. 2.

In FIG. 2, a schematic representation of the transducer assembly 10 illustrates the principles of the present invention. The head mounting flange 13 which supports the tube 11 is shown in cross section, and on the interior of the tube 11 there is a waveguide 20, which has its outer or remote end anchored to the tube through a link 21, and a tension spring 22 to an end plate 23 in the protective tube to maintain the waveguide under some tension. The base end of the waveguide at the compact head 12 is mounted in a mounting block 25. The waveguide is fixed mounting block, such as by soldering the waveguide into the block so that, as will be explained, any torsional pulses or torsional strain wave being transmitted along the waveguide will then be dead-ended at the mounting block 25. The torsional strain wave will be reflected from the mounting block toward the outer end of the tube 11.

The block 25 is mounted onto an end plate or bracket 26 in a suitable manner, which in turn is fixed to the flange 13. The flange 13 is used for mounting the transducer in its desired location. The flange 13 also has a mounting neck 30 into which the protective tube 11 is slipped and fixedly attached. It can be seen that the protective tube 11 surrounds the waveguide 20, and suitable spiders or other supports can be used on the interior of the tube 11 to keep the waveguide 20 generally centered in the tube.

The displacement of the magnetic head 17 relative to the mounting bracket 26 is determined or measured by utilizing a mode converter 32. As shown, the mode converter has two sections, one on each side of the waveguide, and comprises a pair of sensing tapes 32A that are connected to the waveguide and which extend laterally from the tube. The tapes move in direction along the tape length, transversely to the waveguide, when the waveguide twists from a return torsional strain wave moving along the waveguide between the two sections of the mode converter. These tapes then provide a signal in coils that are within the mode converter sections to provide output electrical signals indicating passage of a torsional strain wave along the waveguide.

The electronic circuitry 15 includes a pulse generator 33 which provides a current pulse through the waveguide, along a line 34, with a return line 35 represented only schematically. A current return line is used in all forms of the waveguide, as is well known. The pulse generator provides a stream of current pulses, each of which is also provided to a signal processing circuit 37 for timing purposes. When the current pulse travels down the waveguide in direction from the mounting block 25 toward the remote end of the waveguide at link 21, the current provides a field passing through the waveguide and when this field intercepts the magnetic field from the magnet head 17, it will induce a torsional loading into the waveguide under known principles and thus provide a torsional strain wave pulse in the waveguide. The strain wave is a twisting of the waveguide which is transmitted through the waveguide back toward the mounting block 25. As the torsional pulse moves between the portions of the mode converter 32, the movement of the sensing tapes will generate an electrical signal along line 40 back to the signal processing circuit 37. By proper comparison of the time of start of a particular current pulse, and the time of return of the sonic torsional strain wave pulse, the distance of the magnet head from the mode converter center line will be obtained as an output signal through suitable circuitry indicated at 42.

The principles are well known, as previously stated, and the circuitry is also well known as shown in U.S. Pat. Nos. 3,898,555 and 4,721,902. However, with the long lengths of waveguide being utilized, the return signals are hard to discriminate from external interference noise, even with advanced circuitry. By moving the leading or face surface 25A of the mounting block 25 to be substantially the same distance as one-half of a torsional strain wave signal lobe length the signal at the mode converter will be reinforced by the reflected signal. In other words, the distance that is indicated at 43 in FIG. 2 is equivalent to the length of one-half of a return signal lobe.

The period of a signal lobe of the torsional strain wave outlet signal from the mode converter in a magnetostrictive displacement transducer of the type disclosed is determined by the duration (width) of the current pulses from the pulse generator 33 and the geometry (basically the width) of the tape pickup coils in the mode converter 32, as well as the characteristics (basically the width) of the magnetic field from the magnet head 17. The magnetic field characteristics are determined by the axial length of the magnet and the clearance of the magnet relative to the waveguide. These parameters remain fixed for a given design and thus the period remains the same for the design.

The signal lobe period can be determined experimentally, and analyzed on an oscilloscope. The distance or length of a signal lobe between zero crossings can be calculated by knowing the velocity of propagation of a torsional strain wave in the particular waveguide material chosen.

For a typical signal lobe having a time duration or period of one microsecond, one-half of that is equal to 0.5 usec. The space equivalence is 0.5 usec = 0.55 in.

where 9.05 usec./inch is the inverse of the velocity of propagation of the torsional waves in the waveguide material. This is a typical example, and thus by providing the dimension 43 as 0.055 inches, the benefits of the present invention will be achieved.

This signal enhancement is illustrated in FIGS. 7A through 7D. FIG. 7A illustrates a signal plot 50 of a normal output from a magnetostrictive transducer, wherein the torsional wave is sensed using mode converters such as those used with the present invention, but wherein the mounting block for the waveguide is spaced a substantial distance away from the converters and a damper is put in onto the waveguide between the converter and the waveguide mounting block. Such dampers are mentioned and shown in U.S. Pat. No. 3,898,555 and have been used in order to attenuate or dampen reflected waves so that they would not interfere with the signal that was being transmitted from the magnet head back toward the mode converter.

FIG. 7B illustrates a plot 51 of a signal obtained from a reflector, that is a mounting block having a surface surrounding the support interface with the waveguide comparatively larger than the waveguide cross section so that it reflects strain waves which are equal and opposite of the impinging or return wave.

FIG. 7C illustrates a plot 52 of that same reflected wave as in FIG. 7B displaced along the horizontal time scale by one lobe period. In order to provide a time of travel of a torsional wave from the mode converter center line to the surface 25A and then back, as represented by the distance 43, the mounting block 25 is offset one-half lobe period, and the reflected wave then will have the characteristic shown by plot 52 at the mode converter.

FIG. 7D shows a combined signal plot 53, which is the plots 50 and 52, superimposed. This shows that the combined signal plot 53 has a much higher amplitude lobe, providing a stronger output signal at mode converter 32 without doing anything further to the electronics. A substantial improvement in the ability to discriminate and recognize the return torsional strain wave signal, as opposed to noise level is achieved, particularly where long lengths of waveguide are used and relatively weak torsional strain waves are received. It can be seen that the amplitude of signal can be raised in the range of 40-50% utilizing the present arrangement.

The shorter mounting end bracket or plate 26 and the compact head resulting from the mounting of the mounting block 25 close to the mode converter provides for a more rigid mounting structure because of the reduced length of the end bracket 26 relative to the flange 13. The shorter end bracket 26 can withstand wider vibration frequencies, and larger vibration amplitude inputs, as well as greater shock impacts without failure.

A further important feature of the shorter end bracket 26 is the reduction of the temperature coefficient effects of the end structure. If the temperature increases, the end bracket 26 will expand in length from the flange 13 toward its opposite end. Because the end brackets are generally made of aluminum, which has a substantially greater coefficient of expansion than most waveguide materials (approximately three times as great) mode converter 32 will also shift relative to the flange, which will cause a shifting of the mode converter 32 relative to the magnet head 17. The shorter length of the end bracket 26 over that which was necessary when a damper was interposed between the mode converter and the mounting block for mounting the waveguide drastically reduces the effect of structural expansion due to temperature increases.

Important advantages have been realized from the present construction, including a simpler construction leading to reduced costs, because of the elimination of a previously used damper adjacent the mounting block at the mounting end of the waveguide. The physically shorter construction of the transducer head requires much less mounting space, and as stated previously, the shorter and construction also improves the ability of the transducer to withstand shock and vibration, as well as providing a better temperature coefficient performance. The greatly enhanced torsional wave signal that is obtained by utilizing the reflected wave as a signal enhancer permits operation at greater waveguide lengths and with better signal discrimination.

FIG. 4 shows a typical construction for the waveguide 20, including a waveguide tube 55, and an inner current carrying wire 56 that is insulated from the waveguide tube. This is the construction of waveguide that is shown in U.S. Pat. No. 3,898,555. FIG. 5 illustrates an alternative waveguide wherein a tube 57 forms the current carrying conductor and the carrier for torsional strain waves. Current return lines are provided in each of the different waveguides, and when tube 57 is used, the magnet head surrounds the tube and to provide the torsional strain waves that are sensed for determining displacement.

FIG. 6 shows a solid conductor waveguide 58, which can be used for the waveguide 20, and which would carry current pulses, as well as providing for the torsional strain waves to determine distance.

Although the present invention has been described with reference to preferred embodiments, workers skilled in the art will recognize that changes may be made in form and detail without departing from the spirit and scope of the invention.

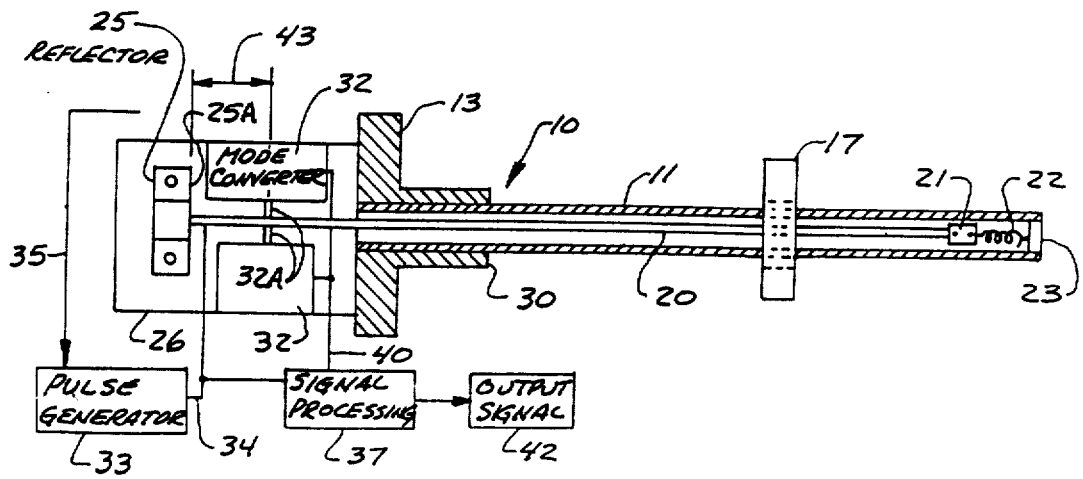

What is claimed is:

1. A transducer for measuring displacement comprising a torsional strain pulse waveguide means, support means for said waveguide means, means for applying periodic, electrical current pulses in direction along the waveguide means, and converter means located in a fixed position along the waveguide means for generating an electrical signal in response to the reception of a torsional strain wave pulse in the waveguide means caused by a magnet adjacent said waveguide means when an electrical pulse is applied and reaches the magnet, the torsional pulse providing a signal output that alternates and has a time, period for a signal lobe, and means for mounting a base end of the waveguide means causing a reflection of the torsional pulse back toward the magnet, said means for mounting being on an opposite side of the converter means from the magnet and being spaced from the converter means a distance of substantially one-half of the distance of travel of a torsional pulse in the waveguide means during a signal lobe period.

2. The transducer of claim 1, wherein said waveguide means comprises a tube, and a separate electrical current carrying wire mounted within said tube.

3. The transducer of claim 1 wherein said waveguide means comprises a tube which also carries electrical current pulses.

4. The transducer of claim 1 wherein said waveguide means comprises a solid wire waveguide that also carries the electrical current pulse.

5. The transducer of claim 1 wherein said converter means and said means for mounting the waveguide means are mounted onto a common end bracket, and a flange mounted to the end bracket for supporting the waveguide means, the converter means, and the means for mounting the waveguide means as a unit.

6. The transducer of claim 5, and an outer protective tube surrounding said waveguide means said protective tube being mounted to said flange, and means connected between a remote end of the waveguide means and a remote end of the protection tube for maintaining a tension in the waveguide means.

7. A compact head arrangement for a magnetostrictive transducer used for measuring displacements of a magnet from a mode converter mounted in said head, including a waveguide capable of transmitting a torsional strain wave, a magnet mounted adjacent said waveguide, means for providing current pulses along said waveguide having a field which intercepts the magnetic field from said magnet and cause a torsional strain wave in said waveguide that forms a signal lobe having a trial time period and which is transmitted back to a mounting end thereof, a mounting block mounting the mounting end of the waveguide and being of size to provide a torsional strain wave reflection surface, and converter means being mounted between the magnet and said reflection surface for converting the torsional strain wave into an electrical signal, said reflection surface being spaced from said converter means a distance substantially equivalent to the distance that a torsional strain wave travels along said waveguide means during a time equal to one-half of the signal lobe time period.

8. The transducer of claim 7 and an end bracket mounting said converter means and said mounting block as a common unit in said compact head.

9. The transducer of claim 7, and circuit means connected to said mode converter means for indicating a relationship between a current pulse transmitted along the waveguide and a torsional strain wave returned by the waveguide as a result of said current pulse.

* * * * *

UNITED STATES PATENT AND TRADEMARK OFFICE
CERTIFICATE OF CORRECTION

PATENT NO. : 4,952,873
DATED : August 28, 1990
INVENTOR(S) : Jacob Tellerman

It is certified that error appears in the above-identified patent and that said Letters Patent is hereby corrected as shown below:

Col. 8, line 1, delete "trial".

Signed and Sealed this

Twenty-sixth Day of November, 1991

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,952,873

DATED : Aug. 28, 1990

INVENTOR(S) : Jacob Tellerman

It is certified that error appears in the above-identified patent and that said Letters Patent is hereby corrected as shown below:

The title page showing the illustrative figure should be deleted and substitute therefor the attached title page.

Signed and Sealed this

Third Day of March, 1992

*Attest:*

HARRY F. MANBECK, JR.

*Attesting Officer*        *Commissioner of Patents and Trademarks*

United States Patent [19]

Tellerman

[11] Patent Number: 4,952,873
[45] Date of Patent: Aug. 28, 1990

[54] COMPACT HEAD, SIGNAL ENHANCING MAGNETOSTRICTIVE TRANSDUCER

[75] Inventor: Jacob Tellerman, Bayside, N.Y.

[73] Assignee: MTS Systems Corporation, Eden Prairie, Minn.

[21] Appl. No.: 405,453

[22] Filed: Sep. 11, 1989

[51] Int. Cl.$^5$ .......................... G01B 7/26; G01F 23/30
[52] U.S. Cl. ............................. 324/207.13; 324/209; 73/314; 333/148
[58] Field of Search ...................... 324/207.13, 207.15, 324/207.24, 207.26, 209, 262, 239; 73/313, 314; 333/148

[56] References Cited

U.S. PATENT DOCUMENTS

| | | | |
|---|---|---|---|
| 3,898,555 | 8/1975 | Tellerman | 324/207.13 |
| 4,028,619 | 6/1977 | Edwards | 324/207.13 |
| 4,071,818 | 1/1978 | Krisst | 324/207.13 |
| 4,305,283 | 12/1981 | Redding | 324/207.24 X |
| 4,510,587 | 4/1985 | Schneider | 324/207.15 X |
| 4,654,590 | 3/1987 | Kitaura et al. | 324/207.13 |
| 4,678,993 | 7/1987 | Vinnemann et al. | 324/207.13 |
| 4,721,902 | 1/1988 | Tellerman | 324/58.5 B |
| 4,803,427 | 2/1989 | Mason et al. | 324/207.13 |
| 4,839,590 | 6/1989 | Koski et al. | 324/209 X |

Primary Examiner—Reinhard J. Eisenzopf
Assistant Examiner—Warren S. Edmonds
Attorney, Agent, or Firm—Kinney & Lange

[57] ABSTRACT

A displacement transducer utilizes a torsional strain waveguide having a magnetic member that is adjustable positioned along the length of the waveguide, when an electrical current pulse is passed along the waveguide and reaches the magnet torsional strain wave is created in the waveguide. The torsional strain wave will be reflected back toward a mounting end of the waveguide where a converter or sensor is positioned to sense the strain wave signal and convert it to an electrical output signal. The strain wave signals have signal lobes of a time period. A waveguide mounting block supports the waveguide at the mounting end and provides a reflection point for the torsional strain waves. The waveguide mounting block is on an opposite side of the signal sensor from the magnet. The mounting block is precisely positioned a distance from the signal sensor that is equal to distance traveled by the torsional strain wave in the waveguide during one-half of the signal lobe time period so that the reflected wave becomes an additive signal to the incoming torsional strain wave signals to provide a greater amplitude to the signal being received.

9 Claims, 2 Drawing Sheets